US011165648B1

(12) United States Patent
Bollineni et al.

(10) Patent No.: US 11,165,648 B1
(45) Date of Patent: Nov. 2, 2021

(54) FACILITATING NETWORK CONFIGURATION TESTING

(71) Applicant: Juniper Networks, Inc., Sunnyvale, CA (US)

(72) Inventors: Anil Kumar Bollineni, Sunnyvale, CA (US); Ruiyan Shi, Beijing (CN); Rui Ma, Beijing (CN); Juguang Huang, Beijing (CN); Lei Wang, Beijing (CN); Yinghong Tong, Beijing (CN); Wei Zhao, Beijing (CN); Ming Lei, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/583,844

(22) Filed: Sep. 26, 2019

(51) Int. Cl.
*G06F 15/173* (2006.01)
*H04L 12/24* (2006.01)
*H04L 12/26* (2006.01)

(52) U.S. Cl.
CPC ...... *H04L 41/0869* (2013.01); *H04L 41/0823* (2013.01); *H04L 41/0853* (2013.01); *H04L 43/50* (2013.01)

(58) Field of Classification Search
CPC . H04L 41/0869; H04L 41/0853; H04L 43/50; H04L 41/0823
USPC ......... 709/223, 224, 230; 370/252, 329, 328
See application file for complete search history.

(56) References Cited

U.S. PATENT DOCUMENTS

| 9,397,922 | B1* | 7/2016 | Collins | .................. H04L 43/06 |
| 10,275,839 | B2* | 4/2019 | Wang | ................. G06Q 30/0282 |
| 10,489,387 | B1* | 11/2019 | Rogynskyy | ............. G06F 40/20 |
| 10,749,890 | B1* | 8/2020 | Aloisio | .................. G06N 5/003 |
| 10,873,983 | B1* | 12/2020 | Patel | ..................... H04W 8/005 |
| 2005/0076113 | A1* | 4/2005 | Klotz | ..................... H04L 43/00 709/224 |
| 2006/0047809 | A1* | 3/2006 | Slattery | ................. H04L 67/025 709/224 |
| 2010/0268834 | A1* | 10/2010 | Eidelman | ............ H04L 41/5009 709/230 |
| 2010/0296409 | A1* | 11/2010 | Fok | ....................... H04W 24/00 370/252 |
| 2011/0282642 | A1* | 11/2011 | Kruger | ................ G06F 11/3668 703/27 |
| 2013/0198203 | A1* | 8/2013 | Bates | ...................... G06F 16/95 707/748 |
| 2015/0019706 | A1* | 1/2015 | Raghunathan et al. ..................... G06F 11/3414 709/224 |
| 2015/0078303 | A1* | 3/2015 | Jongren | ................ H04L 5/0073 370/329 |
| 2015/0142702 | A1* | 5/2015 | Nilsson | ............... H04M 3/2227 706/11 |

(Continued)

*Primary Examiner* — Thuong Nguyen
(74) *Attorney, Agent, or Firm* — Harrity & Harrity, LLP

(57) ABSTRACT

A device may obtain information concerning a potential network and may process the information concerning the potential network to determine a plurality of configuration parameters associated with the potential network. The device may determine, based on the plurality of configuration parameters, at least one network configuration profile. The device may generate, based on the at least one network configuration profile, a network configuration test plan and may cause one or more network devices to be tested according to the network configuration test plan.

20 Claims, 11 Drawing Sheets

(56) References Cited

U.S. PATENT DOCUMENTS

| | | | |
|---|---|---|---|
| 2015/0237650 A1* | 8/2015 | Auvray | H04L 12/6418 370/328 |
| 2015/0332157 A1* | 11/2015 | Baughman | G06N 20/00 706/52 |
| 2016/0063176 A1* | 3/2016 | Martin | G06F 17/10 703/2 |
| 2017/0154267 A1* | 6/2017 | Garg | H04L 51/32 |
| 2017/0373535 A1* | 12/2017 | Dam | H02J 3/06 |
| 2018/0089053 A1* | 3/2018 | Chen | G06F 11/3428 |
| 2018/0324219 A1* | 11/2018 | Xie | H04L 63/1433 |
| 2019/0086988 A1* | 3/2019 | He | H04W 52/0225 |
| 2019/0147376 A1* | 5/2019 | Mahabir | G06Q 10/0635 705/7.28 |
| 2019/0320292 A1* | 10/2019 | Knebl | H04W 4/029 |
| 2020/0036605 A1* | 1/2020 | Xie | H04L 41/5035 |
| 2020/0097847 A1* | 3/2020 | Convertino | G06F 11/3447 |
| 2020/0304533 A1* | 9/2020 | May | H04L 63/20 |
| 2020/0372075 A1* | 11/2020 | Rogynskyy | G06F 16/9024 |

* cited by examiner

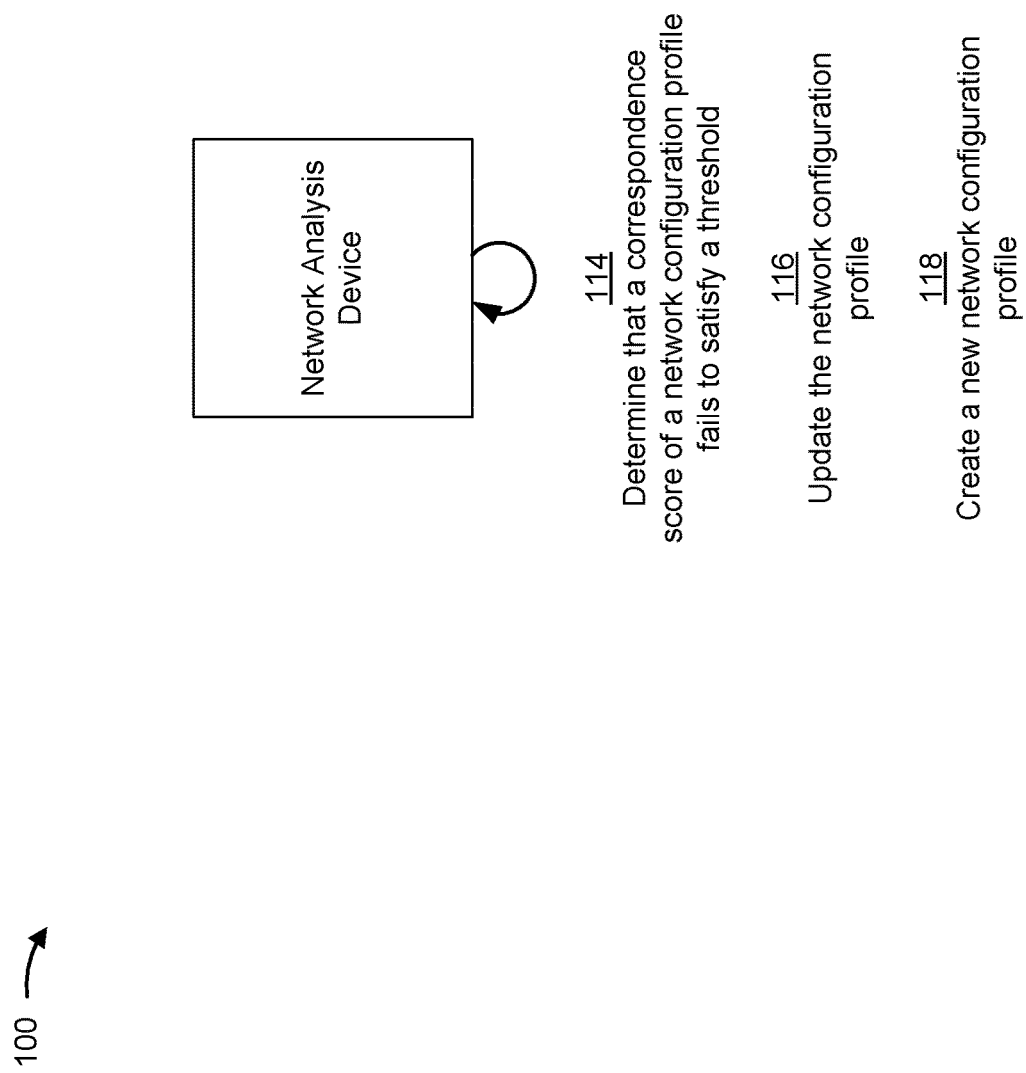

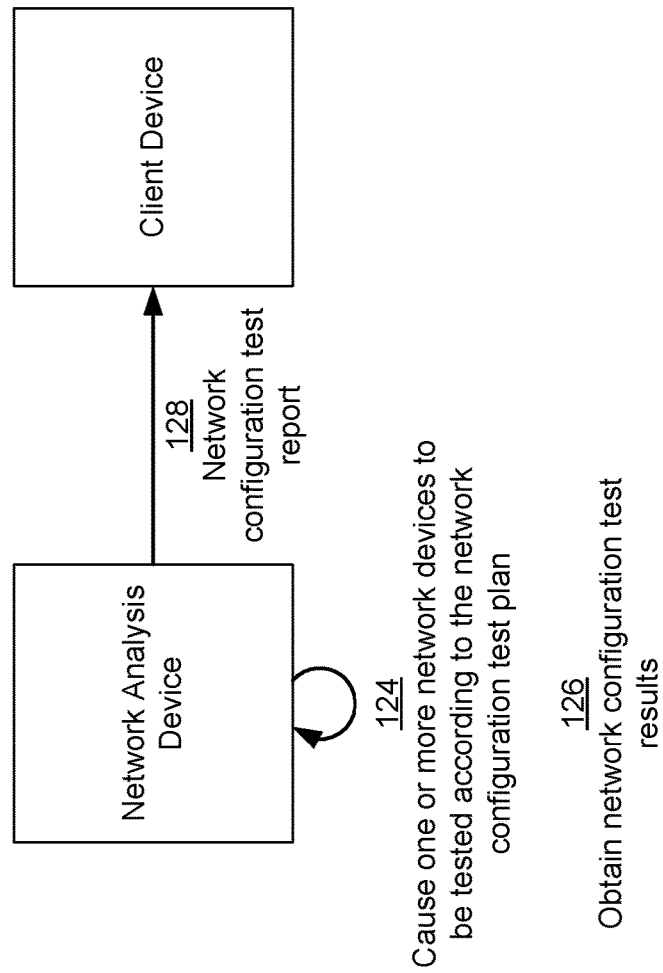

FACILITATING NETWORK CONFIGURATION TESTING

BACKGROUND

Computing and communication networks typically include network devices, such as routers, firewalls, switches or gateways, which transfer or switch data, such as packets, from one or more sources to one or more destinations.

SUMMARY

According to some implementations, a method may include obtaining, by a device, information concerning a potential network; processing, by the device, the information concerning the potential network to determine a plurality of configuration parameters associated with the potential network; determining, by the device and based on the plurality of configuration parameters, at least one network configuration profile; generating, by the device and based on the at least one network configuration profile, a network configuration test plan; and causing, by the device, one or more network devices to be tested according to the network configuration test plan.

According to some implementations, a device may include one or more memories, and one or more processors to: obtain information concerning a potential network; process the information concerning the potential network to determine a plurality of configuration parameters associated with the potential network; send a first report that identifies the plurality of configuration parameters to a client device; determine, based on the plurality of configuration parameters, at least one network configuration profile; generate, based on the at least one network configuration profile, a network configuration test plan; send a second report that identifies the at least one network configuration profile or the network configuration test plan to the client device; cause one or more network devices to be tested according to the network configuration test plan; obtain network configuration test results related to causing the one or more network devices to be tested according to the network configuration test plan; and send a third report that identifies the network configuration test results to the client device.

According to some implementations, a non-transitory computer-readable medium may store one or more instructions. The one or more instructions, when executed by one or more processors of a device, may cause the one or more processors to: obtain information concerning a potential network; process the information concerning the potential network to determine a plurality of configuration parameters associated with the potential network; identify at least one network configuration profile that corresponds to the plurality of configuration parameters; generate, based on the at least one network configuration profile, a network configuration test plan; test one or more network devices according to the network configuration test plan; determine, based on testing the one or more network devices, network configuration test results; generate, based on the network configuration test results, a recommendation concerning the potential network; and send the recommendation to a client device to cause the client device to display the recommendation on a display of the client device.

BRIEF DESCRIPTION OF THE DRAWINGS

FIGS. 1A-1E are diagrams of example implementations described herein.

DETAILED DESCRIPTION

Figure 1A:
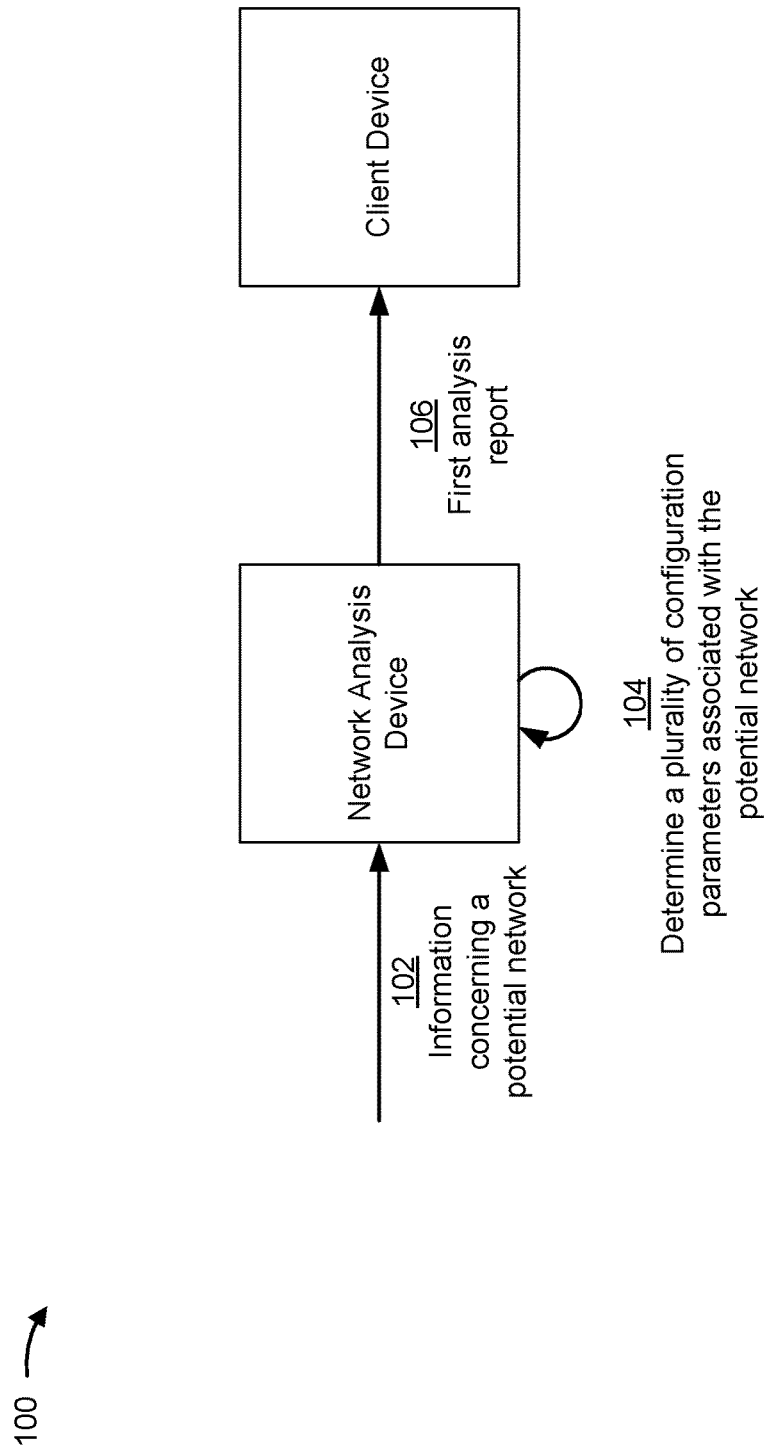

The following detailed description of example implementations refers to the accompanying drawings. The same reference numbers in different drawings may identify the same or similar elements.

A network administrator may consider upgrading a network. In many cases, the network administrator may have a high-level understanding of what additional functionalities, additional capabilities, and/or the like the network is to have, but may not know what network devices, what network configuration, and/or the like is needed to provide the additional functionalities, the additional capabilities, and/or the like. In some cases, the network administrator may deploy a new network configuration (e.g., that includes one or more additional network devices) that is ill-suited to provide the additional functionalities, the additional capabilities, and/or the like. This may result in a suboptimal use of resources (e.g., processing resources, memory resources, power resources, networking resources, and/or the like) of current network devices and/or the additional network devices.

Some implementations described herein provide a network analysis device for causing network configuration testing of a test network (e.g., to assist a network administrator with determining a network configuration of a potential network). In some implementations, the network analysis device may obtain information concerning the potential network (e.g., information provided by the network administrator regarding functionalities, capabilities, and/or the like of the potential network). In some implementations, the network analysis device may identify and/or determine, based on the information concerning the potential network, at least one network configuration profile (also referred to as at least one use case profile) and may generate a network configuration test plan based on the at least one network configuration profile. In some implementations, the network analysis device may cause one or more network devices of the test network to be tested according to the network configuration test plan and may obtain network configuration test results. In some implementations, the network analysis device may generate a report regarding the network configuration test results and may generate a recommendation concerning the potential network (e.g., a recommendation to include or not to include the one or more network devices in the potential network).

In this way, some implementations provided herein cause one or more network devices of a test network to be tested to facilitate determining a network configuration of a potential network. Some implementations described herein can provide information that can be used to ensure an optimal performance of the potential network, an optimal use of resources (e.g., processing resources, memory resources, power resources, networking resources, and/or the like) of network devices of the potential network, and/or the like. Moreover, the network analysis device may reduce an amount of time and/or resources needed to determine a network configuration of a potential network as compared to using traditional methods.

FIGS. 1A-1E are diagrams of one or more example implementations 100 described herein. As shown in FIGS. 1A-1E, example implementation(s) 100 may include a network analysis device and a client device. The network analysis device and the client device may be connected via a network, such as a cellular network, a local area network (LAN), a core network, an access network, a wide area network (WAN) such as the Internet, a cloud network, and/or the like.

As shown in FIG. 1A and by reference number 102, the network analysis device may obtain information concerning a potential network. The information concerning the potential network may include information concerning one or more criteria of the potential network. For example, the information concerning the potential network may comprise information concerning a purpose of the potential network; information identifying one or more segments of the potential network; information indicating one or more features of the potential network; information identifying a topology of the potential network; information indicating a traffic flow of the potential network; information indicating a bandwidth of the potential network; information indicating a latency of the potential network; information indicating a data rate of the potential network; information concerning network deployment parameters of the potential network (e.g., a number of nodes of the potential network, a number of network sessions of the potential network, one or more security profiles to be applied to traffic of the potential network, and/or the like); information indicating a user device capacity of the potential network; and/or the like.

In some implementations, the network analysis device may provide a user interface for a user (e.g., a user of the client device) to input the information concerning the potential network to the network analysis device. As another example, another device (e.g., the client device) may send a file concerning the potential network (e.g., a potential network requirements file) to the network analysis device. Additionally, or alternatively, the network analysis device may obtain the file from a server device or a similar device.

As shown by reference number 104, the network analysis device may determine a plurality of configuration parameters associated with the potential network. The plurality of configuration parameters may be associated with a topology of the potential network, one or more respective functions of at least one network device associated with the potential network, traffic routing associated with the potential network (e.g., traffic routing of packets between a plurality of zones of the potential network), and/or the like. The network analysis device may process the information concerning the potential network to determine the plurality of configuration parameters associated with the potential network.

For example, the network analysis device may process the information concerning the potential network using a configuration analysis technique (e.g., an analysis technique concerning a topology of the potential network), a traffic analysis technique (e.g., an analysis technique concerning a flow of traffic in the potential network), a resource analysis technique (e.g., an analysis technique concerning use of resources of one or more network devices), a verification analysis technique (e.g., an analysis technique concerning one or more goals of the potential network); and/or the like. The network analysis device may thereby determine a plurality of capabilities of the potential network, wherein each configuration parameter, of the plurality of configuration parameters, may be associated with one or more capabilities of the plurality of capabilities of the potential network. The network analysis device may process the plurality of capabilities to determine the plurality of configuration parameters.

As shown by reference number 106, the network analysis device may generate and send a first analysis report to the client device. The first analysis report may identify the plurality of configuration parameters and/or the information concerning the potential network. In some implementations, the client device may receive the first analysis report, which may cause the client device to display the first analysis report on a display screen of the client device.

In some implementations, the network analysis device may analyze the plurality of configuration parameters and/or the information concerning the potential network to generate first analysis information. For example, the network analysis device may generate a tree diagram, a word cloud, a pie graph, a relationship graph, and/or the like based on the plurality of configuration parameters and/or the information concerning the potential network. The first analysis report may include the first analysis information in the first analysis report.

Figure 1B:
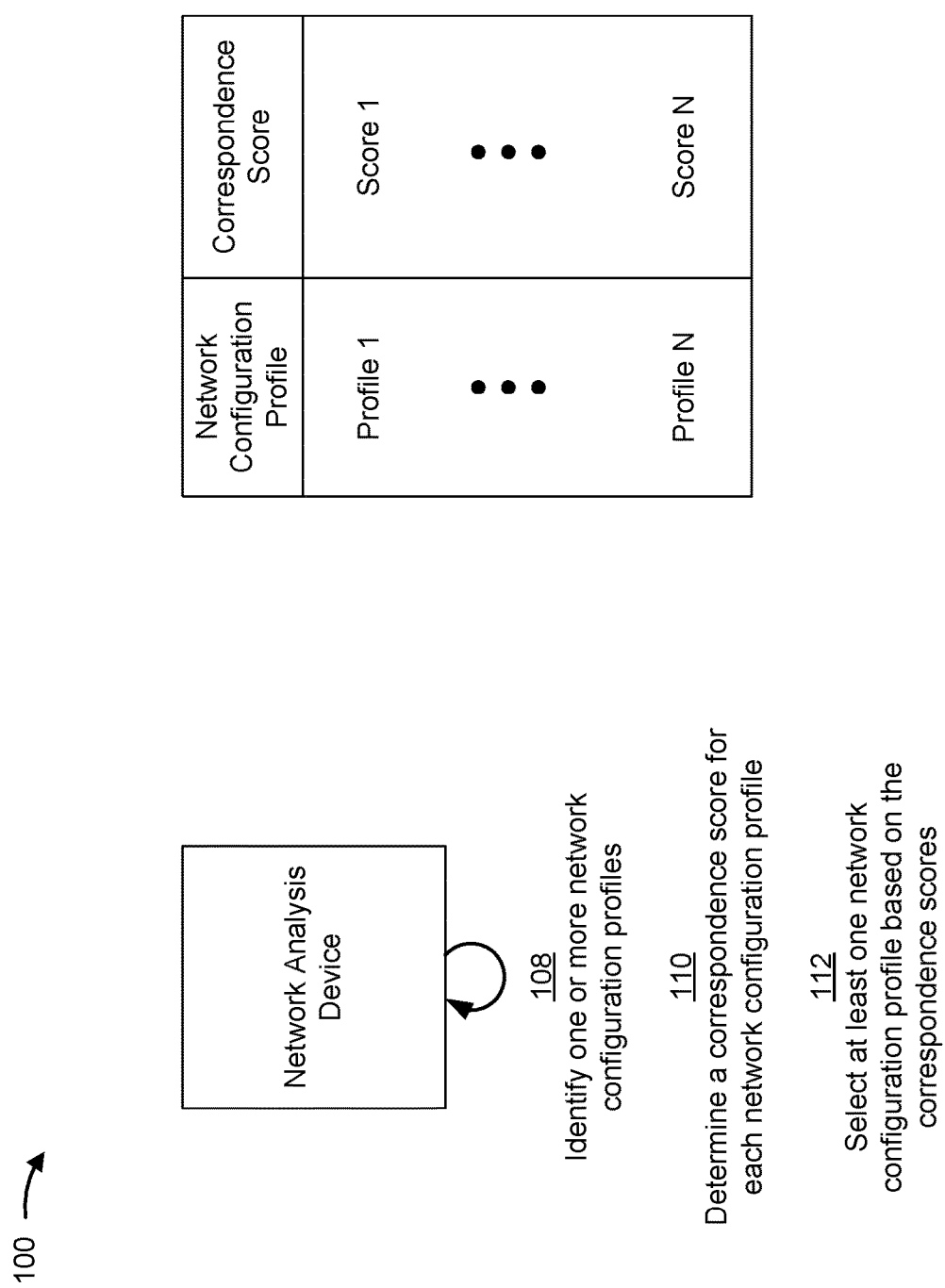

As shown in FIG. 1B and by reference number 108, the network analysis device may identify one or more network configuration profiles (also referred to as use case profiles). As shown in FIG. 1B, the one or more network configuration profiles may include Profile 1 through Profile N (where N is greater than or equal to 1). A network configuration profile may be associated with a test network and may include one or more network configuration profile parameters. The one or more network configuration profile parameters may be associated with a topology of the test network, one or more respective functions of at least one network device associated with the test network, traffic routing associated with the test network (e.g., traffic routing of packets between a plurality of zones of the test network), and/or the like. A data structure (e.g., included in the network analysis device or accessible to the network analysis device via the network) may store the one or more network configuration profiles, and the network analysis device may communicate with the data structure to obtain and/or identify the one or more network configuration profiles.

As shown by reference number 110, the network analysis device may determine a respective correspondence score for each network configuration profile of the one or more network configuration profiles. As shown in FIG. 1B, each network configuration profile (shown as Profiles 1 through N, where N is greater than or equal to 1) has a respective correspondence score (shown as Score 1 through N, where N is greater than or equal to 1). A correspondence score may indicate a correspondence between a network configuration profile and the plurality of configuration parameters associated with the potential network. For example, the network analysis device may determine a percentage of the plurality of configuration parameters associated with the potential network that correspond to at least one network configuration profile parameter of the one or more network configuration profile parameters included in the network configuration profile. The correspondence score for the network configuration profile may be the determined percentage.

Additionally, or alternatively, the network analysis device may generate one or more sets of network configuration profiles, wherein a set of network configuration profiles includes at least two network configuration profiles of the one or more network configuration profiles. The network analysis device may determine, for each set of network configuration profiles, of the one or more sets of network configuration profiles, a respective correspondence score that indicates a correspondence between the set of network configuration profiles and the plurality of configuration parameters. For example, the network analysis device may determine a percentage of the plurality of configuration parameters associated with the potential network that correspond to at least one network configuration profile parameter of the respective one or more network configuration profile parameters of each network configuration profile in a set of network configuration profiles. The correspondence score for the set of network configuration profiles may be the determined percentage.

Figure 1D:
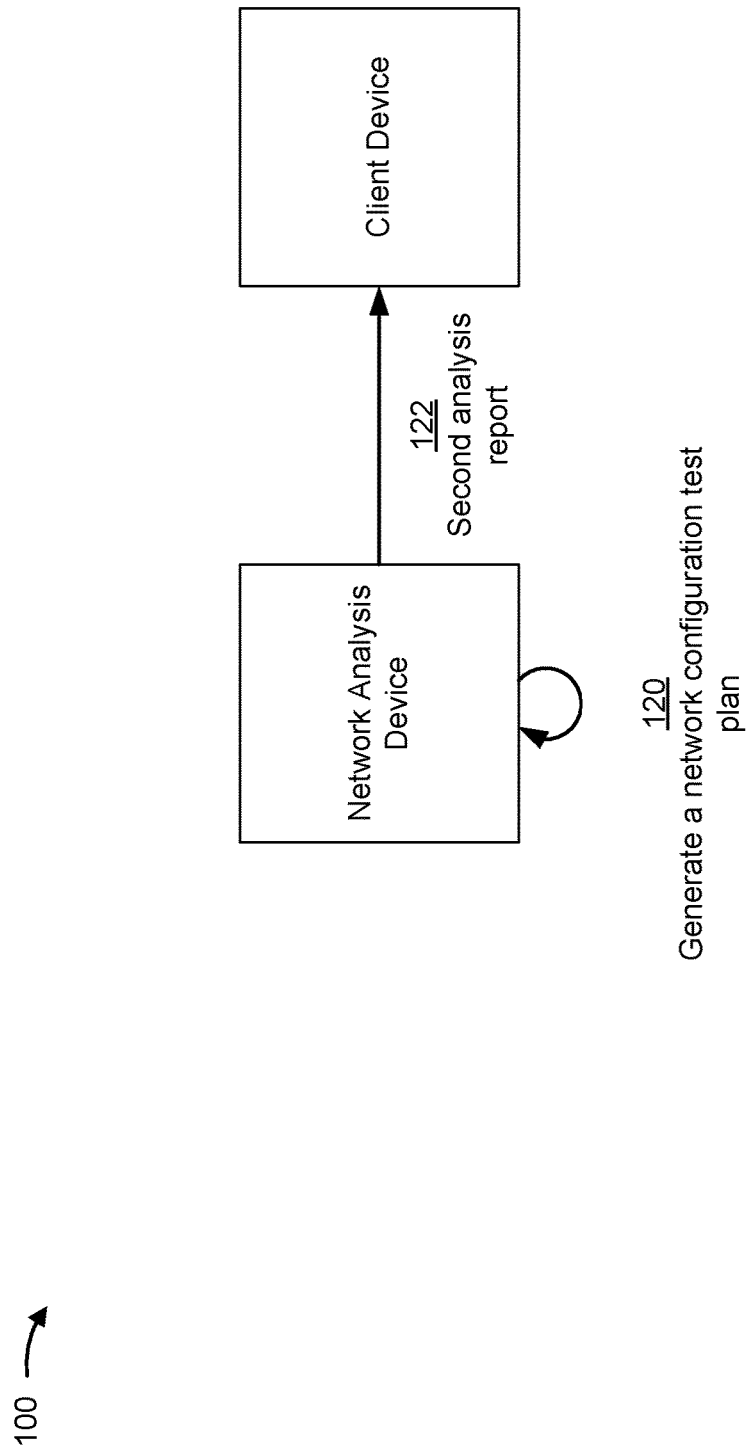

As shown by reference number 112, the network analysis device may select at least one network configuration profile, of the one or more network configuration profiles, that corresponds to the plurality of configuration parameters (e.g., to generate a network configuration test plan, as described herein in relation to FIG. 1D). For example, the network analysis device may identify a network configuration profile, of the one or more network configuration profiles, that has a correspondence score that satisfies (e.g., is greater than or equal to) a threshold and may select the network configuration profile. As another example, the network analysis device may identify a network configuration profile, of the one or more network configuration profiles, that has the highest correspondence score (e.g., the correspondence score is greater than or equal to the respective correspondence score of any other network configuration profile of the one or more network configuration profiles) and may select the network configuration profile.

In another example, the network analysis device may identify a set of network configuration profiles, of the one or more sets of network configuration profiles, that has a correspondence score that satisfies (e.g., is greater than or equal to) a threshold. The network analysis device may select the at least two network configuration profiles that are included in the set of network configuration profiles. As an additional example, the network analysis device may identify a set of network configuration profiles, of the one or more sets of network configuration profiles, that has the highest correspondence score (e.g., the correspondence score is greater than or equal to the respective correspondence score of any other set of network configuration profiles of the one or more sets of network configuration profiles) and may select the at least two network configuration profiles that are included in the set of network configuration profiles that has the highest correspondence score.

As shown in FIG. 1C, the network analysis device may determine to update a network configuration profile and/or create a new network configuration profile rather than select at least one existing network configuration profile of the one or more network configuration profiles.

For example, the network analysis device may identify a network configuration profile, of the one or more network configuration profiles, such as the network configuration profile that has the highest correspondence score (e.g., the correspondence score of the network configuration profile is greater than or equal to the respective correspondence score of any other network configuration profile of the one or more network configuration profiles). As shown by reference number 114, the network analysis device may determine that the correspondence score of the network configuration profile fails to satisfy (e.g., is less than) a threshold. This may indicate that the network configuration profile does not sufficiently correspond to the plurality of configuration parameters (e.g., to generate a network configuration test plan based on the network configuration profile, as described herein in relation to FIG. 1D). The network analysis device may therefore update the network configuration profile, as described herein in relation to reference number 116, or create a new network configuration profile, as described herein in relation to reference number 118.

As shown by reference number 116, the network analysis device may update the network configuration profile to add one or more additional network configuration profile parameters to the network configuration profile. Updating the network configuration profile may improve the correspondence score of the network configuration profile (e.g., raise the correspondence score such that the correspondence score, after the network configuration profile is updated, is greater than the correspondence score prior to the network configuration profile being updated). In some implementations, the network analysis device may determine the correspondence score of the updated network configuration profile and may select the updated network configuration profile (e.g., when the correspondence score of the updated network configuration profile satisfies (e.g., is greater than or equal to) the threshold).

In some implementations, the network analysis device may update the network configuration profile using a machine learning model. For example, the network analysis device may process the plurality of configuration parameters using the machine learning model to determine and/or generate the one or more additional network configuration profile parameters to add to the network configuration profile.

In some implementations, the network analysis device may generate and/or train the machine learning model. For example, the network analysis device may obtain (e.g., from the data structure) and process historical information (e.g., historical information concerning one or more configuration parameters, historical information concerning one or more network configuration profile parameters, and/or the like) to generate and/or train the machine learning model to generate the one or more network configuration profile parameters.

In some implementations, the network analysis device may perform a set of data manipulation procedures to pre-process the historical information to generate the machine learning model. The network analysis device may use a data pre-processing procedure, a model training procedure, a model verification procedure, and/or the like to pre-process the historical information to generate pre-processed historical information. For example, the network analysis device may pre-process the historical information to remove irrelevant information, confidential data, corrupt data, and/or the like. In this way, the network analysis device may organize thousands, millions, or billions of data entries for machine learning and model generation.

In some implementations, the network analysis device may perform a training operation when generating the machine learning model. For example, the network analysis device may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the network analysis device may train the machine learning model on this minimum feature set, thereby reducing processing required to train the machine learning model, and may apply a classification technique to the minimum feature set.

When training the machine learning model, the network analysis device may utilize a random forest classifier technique to train the machine learning model. For example, the network analysis device may utilize a random forest classifier technique to construct multiple decision trees during training and may output a classification of the historical information. As another example, the network analysis device may utilize a random forest regression technique to construct multiple decision trees during training and may output a numeric predication associated with the historical information. Additionally, or alternatively, when training the machine learning model, the network analysis device may utilize one or more gradient boosting techniques to generate the machine learning model. For example, the network analysis device may utilize an xgboost classifier technique, an xgboost regression technique, a gradient boosting machine (GBM) technique, a gradient boosting tree, and/or the like to generate a prediction model from a set of weak prediction models.

When training the machine learning model, the network analysis device may utilize a logistic regression technique to train the machine learning model. For example, the network analysis device may utilize a binary classification of the historical information (e.g., whether the historical information is indicative of a particular accurate prediction), a multi-class classification of the historical information (e.g., whether the historical information is indicative of one or more accurate predictions), and/or the like to train the machine learning model. Additionally, or alternatively, when training the machine learning model, the network analysis device may utilize a naïve Bayes classifier technique to train the machine learning model. For example, the network analysis device may utilize binary recursive partitioning to divide the historical information into various binary categories (e.g., starting with whether the historical information is indicative of a particular accurate prediction). Based on using recursive partitioning, the network analysis device may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the network analysis device may utilize a support vector machine (SVM) classifier technique. For example, the network analysis device may utilize a linear model to implement non-linear class boundaries, such as via a max margin hyperplane. Additionally, or alternatively, when utilizing the SVM classifier technique, the network analysis device may utilize a binary classifier to perform a multi-class classification. Use of an SVM classifier technique may reduce or eliminate overfitting, may increase a robustness of the machine learning model to noise, and/or the like.

In some implementations, the network analysis device may train the machine learning model using a supervised training procedure. In some implementations, the network analysis device may receive additional input to the machine learning model from other sources. In some implementations, the network analysis device may use one or more other model training techniques, such as a neural network technique, and/or the like. For example, the network analysis device may perform a multi-layer artificial neural network processing technique (e. g, using a recurrent neural network architecture, a two-layer feedforward neural network architecture, a three-layer feedforward neural network architecture, and/or the like) to perform pattern recognition with regard to patterns in the historical information. Use of the artificial neural network processing technique may improve an accuracy of a supervised learning model generated by the network analysis device by being more robust to noisy, imprecise, or incomplete data, and by enabling the network analysis device to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how patterns change over time (e.g., over a month, a year, and/or the like).

In some implementations, a different device, such as a server device, may generate and/or train the machine learning model. The network analysis device may obtain the machine learning model from the different device. For example, the different device may send the machine learning model to the network analysis device and/or the network analysis device may request and receive the machine learning model from the different device. In some implementations, the different device may update and send (e.g., on a scheduled basis, on an on-demand basis, on a triggered basis, and/or the like) the machine learning model to the network analysis device. The network analysis device may obtain the updated machine learning model from the different device.

In this way, the network analysis device may use artificial intelligence techniques, machine learning techniques, deep learning techniques, and/or the like to determine one or more associations between historical information.

As shown by reference number 118, the network analysis device may create a new network configuration profile (e.g., based on determining that a correspondence score of a network configuration profile fails to satisfy (e.g., is less than) a threshold, as described herein in relation to reference number 114). In some implementations, the network analysis device may create the new network configuration profile by generating the new network configuration profile and adding one or more new network configuration profile parameters to the new network configuration profile. In some implementations, the network analysis device may generate the new network configuration profile using the machine learning model. For example, the network analysis device may process the plurality of configuration parameters using the machine learning model to determine and/or generate the one or more new network configuration profile parameters to include in the new network configuration profile. In some implementations, the network analysis device may determine the correspondence score of the new network configuration profile and may select the new network configuration profile (e.g., when the correspondence score of the new network configuration profile satisfies (e.g., is greater than or equal to) the threshold).

As shown in FIG. 1D and by reference number 120, the network analysis device may generate a network configuration test plan. For example, the network analysis device may process the selected at least one network configuration profile, the selected updated network configuration profile, the selected new network configuration plan, and/or the like to generate the network configuration test plan. The network configuration test plan may include information identifying one or more network devices to be tested in a test network; information identifying a network topology of the test network associated with the one or more network devices; information concerning traffic generation for the test network; information concerning an amount of time to test the one or more network devices; and/or the like.

As shown by reference number 122, the network analysis device may send a second analysis report to the client device. The second analysis report may identify the network configuration test plan and/or the selected at least one network configuration profile, the selected updated network configuration profile, the selected new network configuration plan, and/or the like. In some implementations, the client device may receive the second analysis report, which may, for example, cause the client device to display the second analysis report on a display screen of the client device.

As shown in FIG. 1E and by reference number 124, the network analysis device may cause the one or more network devices of the test network to be tested according to the network configuration test plan. For example, the network analysis device may test the one or more network devices according to the network configuration test plan. As another example, the network analysis device may send the network configuration test plan to a network testing device to cause the network testing device to test the one or more network devices according to the network configuration test plan.

As shown by reference number 126, the network analysis device may determine (e.g., by directly testing the one or more network devices) and/or obtain (e.g., from the network testing device) network configuration test results regarding the testing of the one or more network devices of the test network according to the network configuration test plan. The network configuration test results may indicate a respective availability (e.g., information concerning reachability of the one or more network devices during testing), a respective health (e.g., information identifying a quantity and/or types of errors generated by the one or more network devices during testing), a respective performance (e.g., information concerning utilization, delay, and/or the like of the one or more network devices), and/or the like of the one or more network devices. The network analysis device may determine and/or obtain the network configuration test results while the one or more network devices are being tested (e.g., in real time) and/or after the one or more network devices have been tested.

As shown by reference number 128, the network analysis device may send a network configuration test report to the client device. The network configuration test report may include and/or identify the network configuration test results regarding the testing of the one or more network devices of the test network according to the network configuration test plan. In some implementations, the client device may receive the network configuration test report, which may cause the client device to display the network configuration test report on a display screen of the client device.

In some implementations, the network analysis device may generate and send the network configuration test report to the client device on a scheduled basis (e.g., every second, every minute, every five minutes, and/or the like) to ensure that the client device is receiving up-to-date information regarding testing of the one or more network devices while the one or more network devices are being tested. This may allow a user of the client device to monitor the testing of the one or more network devices in real-time. Additionally, or alternatively, the network device may generate and send the network configuration test report to the client device after testing of the one or more network devices has finished.

In some implementations, the network analysis device may process the network configuration test results to generate a recommendation (e.g., a recommendation to include or not to include the one or more network devices in the potential network). The network analysis device may include the recommendation in the network configuration test report.

Additionally, or alternatively, when the network analysis device has updated a network configuration profile and/or created a new network configuration profile, the network analysis device may cause the updated network configuration profile and/or the new network configuration profile to be added to the data structure. For example, the network analysis device may send, to the data structure (e.g., to a database), the updated network configuration profile and/or the new network configuration profile to cause the data structure to save the updated network configuration profile and/or the new network configuration profile with the one or more network configuration profiles.

As indicated above, FIGS. 1A-1E are provided merely as one or more examples. Other examples may differ from what is described with regard to FIGS. 1A-1E.

Figure 2:
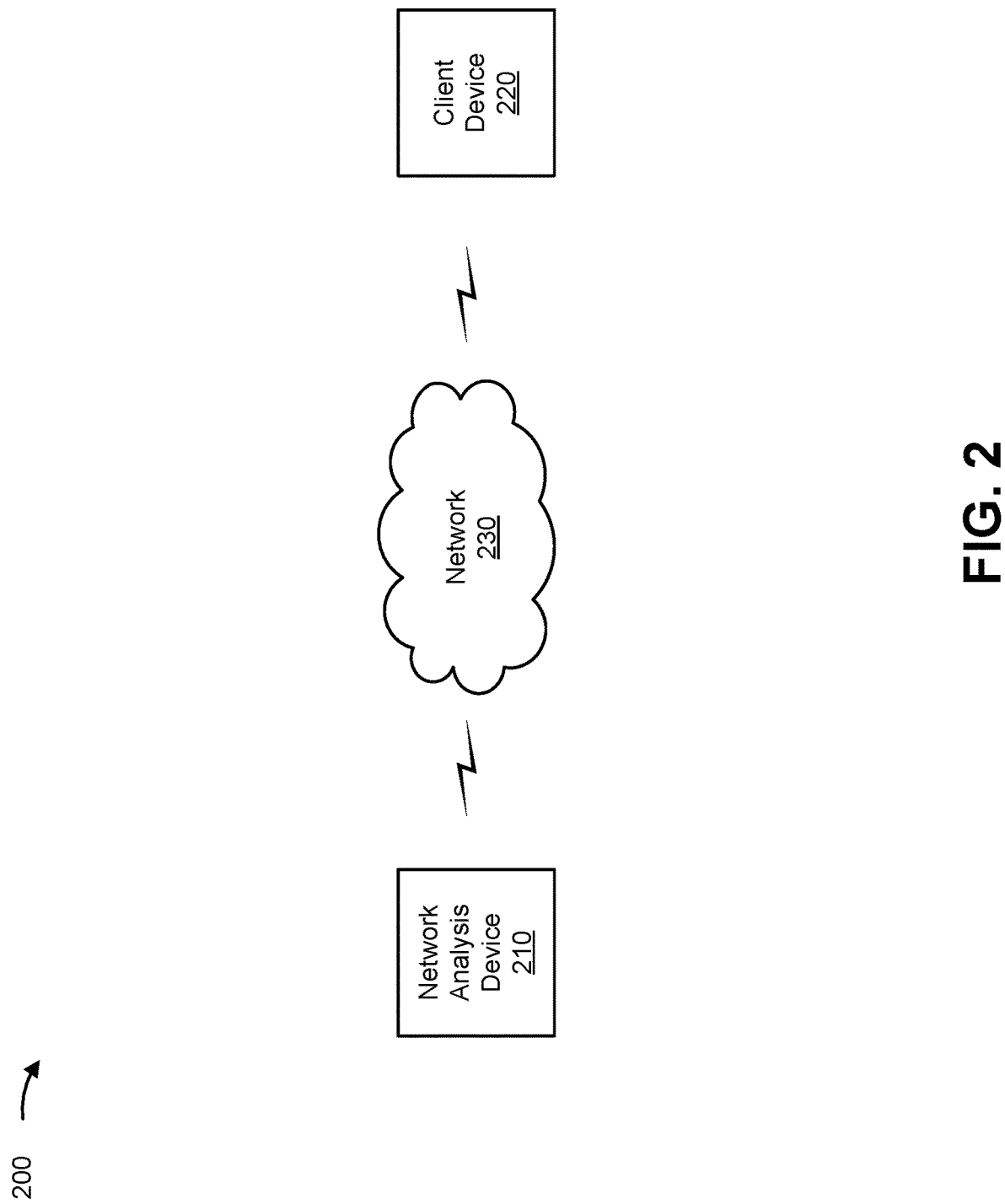
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network analysis device 210, client device 220, and network 230. Devices of environment 200 may interconnect via wired connections, wireless connections, or a combination of wired and wireless connections.

Network analysis device 210 includes one or more devices capable of receiving, generating, storing, processing, analyzing, and/or providing information, such as information described herein. For example, network analysis device 210 may include a computer (e.g., a desktop computer, a laptop computer, a tablet computer, a handheld computer, a server device, and/or the like) or a similar device. In some implementations, network analysis device 210 may communicate with client device 220 (e.g., via network 230).

Client device 220 includes one or more devices capable of receiving, generating, storing, processing, and/or providing information, such as information described herein. For example, client device 220 may include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, or a similar device. In some implementations, client device 220 may communicate with network analysis device 210 (e.g., via network 230).

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
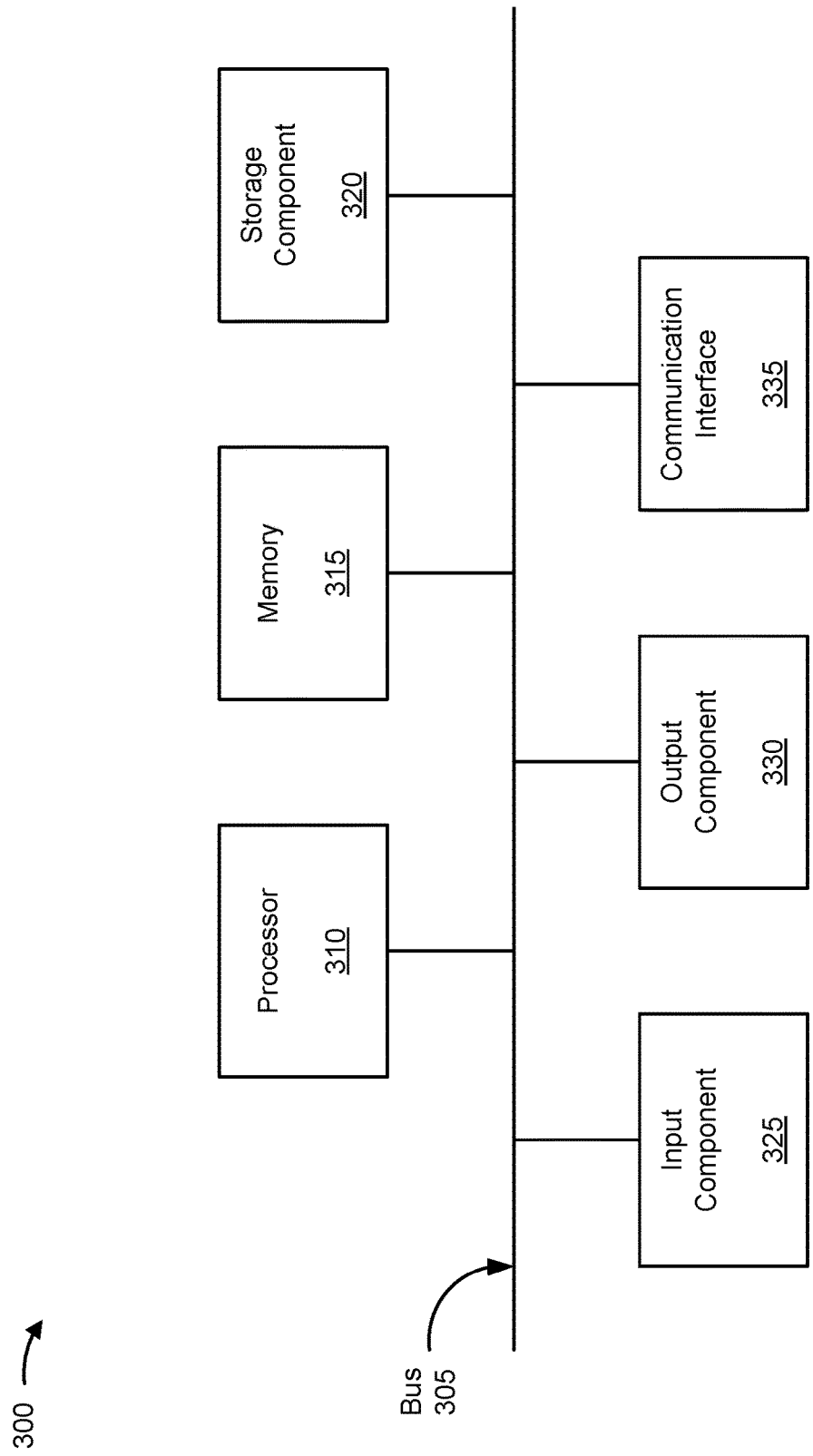
FIGS. 3A and 3B are diagrams of example components of one or more devices of FIG. 2.
Figure 3B:
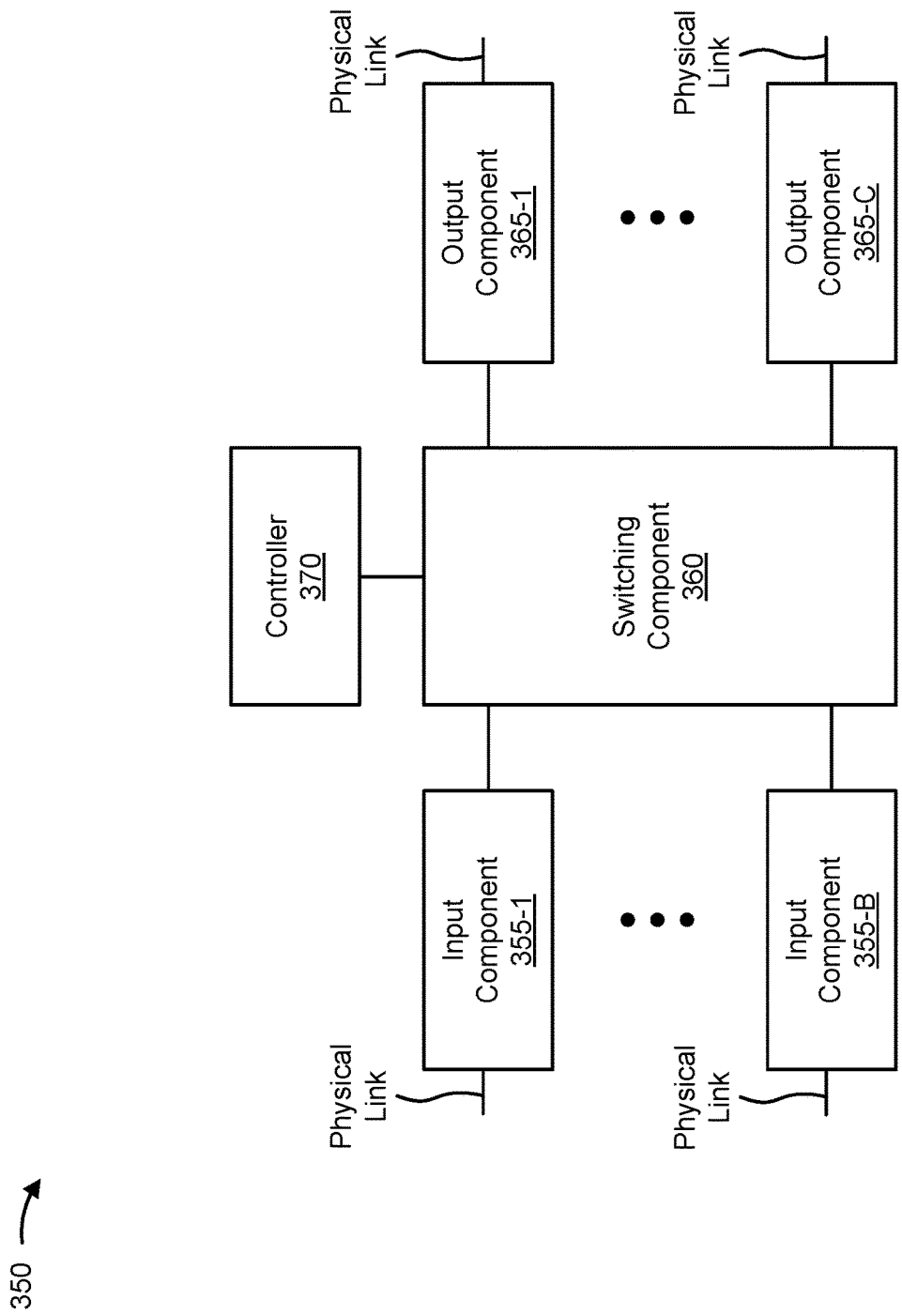

FIGS. 3A-3B are diagrams of example components of one or more devices of FIG. 2. FIG. 3A is a diagram of example components of a device 300. Device 300 may correspond to network analysis device 210, client device 220, and/or the like. In some implementations, network analysis device 210, client device 220, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network analysis device 210, client device 220, and/or the like. In some implementations, network analysis device 210, client device 220, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
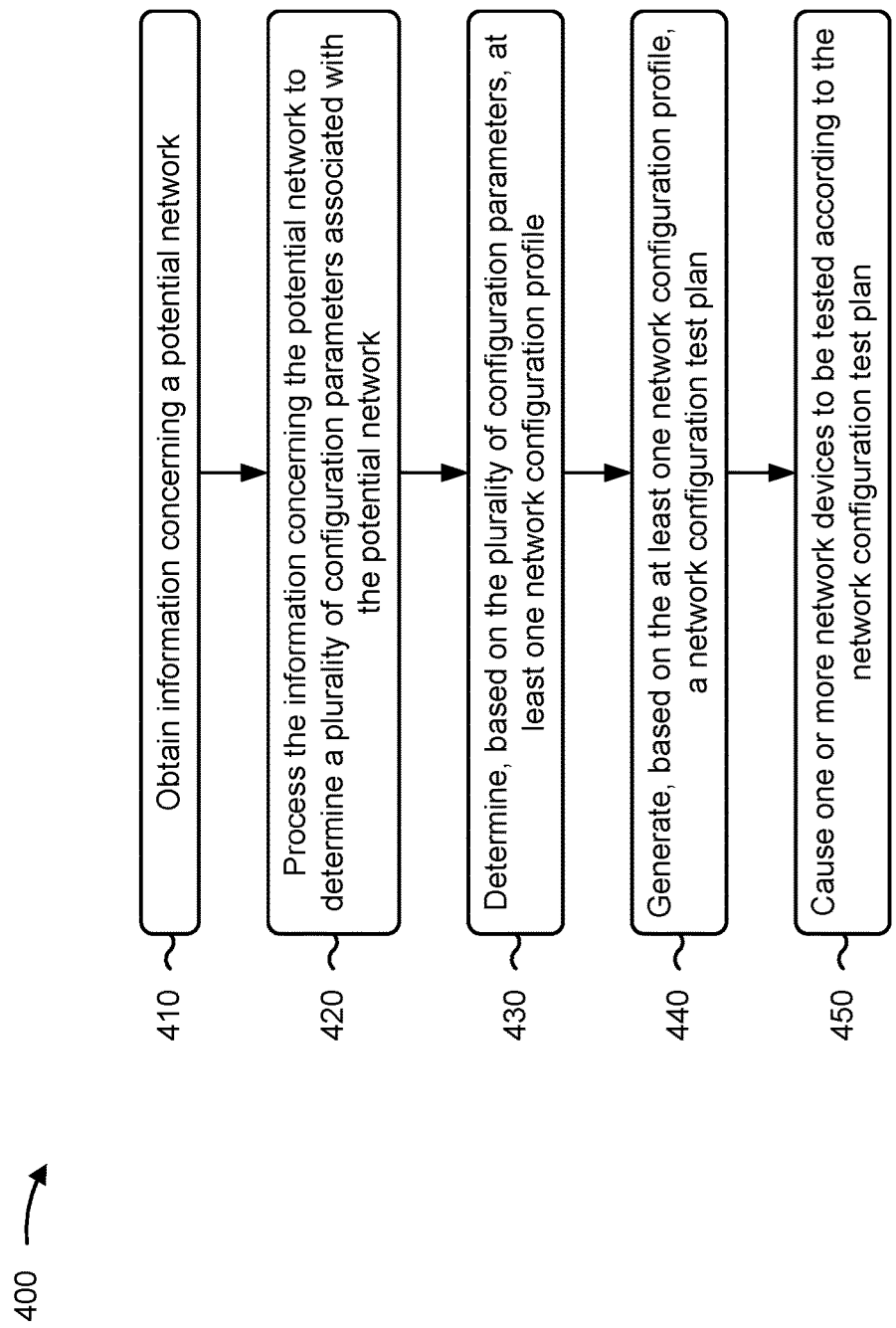
FIGS. 4-6 are flowcharts of example processes for facilitating network configuration testing.

FIG. 4 is a flowchart of an example process 400 for facilitating network configuration testing. In some implementations, one or more process blocks of FIG. 4 may be performed by a device, such as a network analysis device (e.g., network analysis device 210). In some implementations, one or more process blocks of FIG. 4 may be performed by another device or a group of devices separate from or including the device, such as client device 220, and/or the like.

As shown in FIG. 4, process 400 may include obtaining information concerning a potential network (block 410). For example, the device (e.g., using processor 310, memory 315, storage component 320, input component 325, output component 330, communication interface 335, input component 355, switching component 360, output component 365, controller 370, and/or the like) may obtain information concerning a potential network, as described above.

As further shown in FIG. 4, process 400 may include processing the information concerning the potential network to determine a plurality of configuration parameters associated with the potential network (block 420). For example, the device (e.g., using processor 310, memory 315, storage component 320, input component 325, output component 330, communication interface 335, input component 355, switching component 360, output component 365, controller 370, and/or the like) may process the information concerning the potential network to determine a plurality of configuration parameters associated with the potential network, as described above.

As further shown in FIG. 4, process 400 may include determining, based on the plurality of configuration parameters, at least one network configuration profile (block 430). For example, the device (e.g., using processor 310, memory 315, storage component 320, input component 325, output component 330, communication interface 335, input component 355, switching component 360, output component 365, controller 370, and/or the like) may determine, based on the plurality of configuration parameters, at least one network configuration profile, as described above.

As further shown in FIG. 4, process 400 may include generating, based on the at least one network configuration profile, a network configuration test plan (block 440). For example, the device (e.g., using processor 310, memory 315, storage component 320, input component 325, output component 330, communication interface 335, input component 355, switching component 360, output component 365, controller 370, and/or the like) may generate, based on the at least one network configuration profile, a network configuration test plan, as described above.

As further shown in FIG. 4, process 400 may include causing one or more network devices to be tested according to the network configuration test plan (block 450). For example, the device (e.g., using processor 310, memory 315, storage component 320, input component 325, output component 330, communication interface 335, input component 355, switching component 360, output component 365, controller 370, and/or the like) may cause one or more network devices to be tested according to the network configuration test plan, as described above.

Process 400 may include additional implementations, such as any single implementation or any combination of implementations described below and/or in connection with one or more other processes described elsewhere herein.

In a first implementation, process 400 includes obtaining network configuration test results related to causing the one or more network devices to be tested according to the network configuration test plan; generating, based on the network configuration test results, a network configuration test report; and causing the network configuration test report to be displayed on a display screen of another device.

In a second implementation, alone or in combination with the first implementation, the information concerning the potential network comprises at least one of: information concerning a purpose of the potential network; information identifying one or more segments of the potential network; information indicating one or more features of the potential network; information identifying a topology of the potential network; information indicating a traffic flow of the potential network; information indicating a bandwidth of the potential network; information indicating a latency of the potential network; information indicating a data rate of the potential network; information concerning network deployment parameters of the potential network; or information indicating a user device capacity of the potential network.

In a third implementation, alone or in combination with one or more of the first and second implementations, processing the information concerning the potential network to determine the plurality of configuration parameters associated with the potential network comprises: processing the information concerning the potential network to determine a plurality of capabilities of the potential network and processing the plurality of capabilities to determine the plurality of configuration parameters, wherein each configuration parameter, of the plurality of configuration parameters, is associated with one or more capabilities of the plurality of capabilities of the potential network.

In a fourth implementation, alone or in combination with one or more of the first through third implementations, at least some configuration parameters of the plurality of configuration parameters are associated with network device functions.

In a fifth implementation, alone or in combination with one or more of the first through fourth implementations, determining the at least one network configuration profile comprises identifying a plurality of network configuration profiles; determining, for each network configuration profile, of the plurality of network configuration profiles, a respective correspondence score that indicates a correspondence between the network configuration profile and the plurality of configuration parameters; identifying one or more network configuration profiles, of the plurality of network configuration profiles, that have a respective correspondence score that satisfies a threshold; and selecting the at least one network configuration profile from the one or more identified network configuration profiles.

In a sixth implementation, alone or in combination with one or more of the first through fifth implementations, determining the at least one network configuration profile comprises identifying a plurality of network configuration profiles; determining, for each network configuration profile, of the plurality of network configuration profiles, a respective correspondence score that indicates a correspondence between the network configuration profile and the plurality of configuration parameters; identifying a particular network configuration profile, of the plurality of network configuration profiles, with a particular correspondence score; determining that the particular correspondence score of the particular network configuration profile fails to satisfy a threshold; updating, using a machine learning model and based on the plurality of configuration parameters, the particular network configuration profile, wherein updating the particular network configuration profile increases the particular correspondence score, and selecting the particular network configuration profile as the at least one network configuration profile.

In a seventh implementation, alone or in combination with one or more of the first through sixth implementations, the network configuration test plan includes at least one of information identifying the one or more network devices; information identifying a network topology of a test network associated with the one or more network devices; information concerning traffic generation for the test network; or information concerning an amount of time to test the one or more network devices.

In an eighth implementation, alone or in combination with one or more of the first through seventh implementations, causing the one or more network devices to be tested according to the network configuration test plan comprises sending the network configuration test plan to a network testing device to cause the network testing device to test the one or more network devices according to the network configuration test plan.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
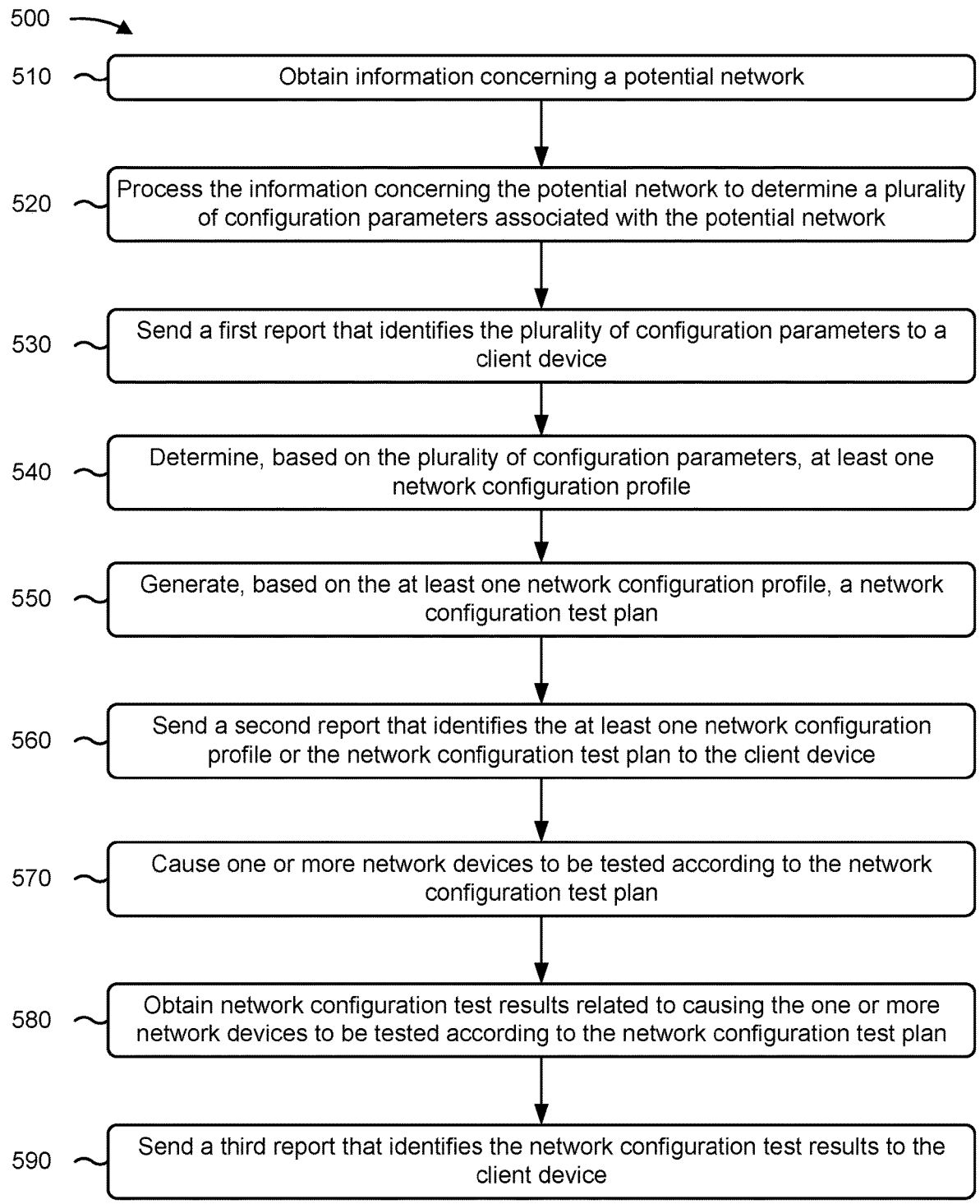

FIG. 5 is a flow chart of an example process 500 for facilitating network configuration testing. In some implementations, one or more process blocks of FIG. 5 may be performed by a device, such as a network analysis device (e.g., network analysis device 210). In some implementations, one or more process blocks of FIG. 5 may be performed by another device or a group of devices separate from or including the device, such as client device 220, and/or the like.

As shown in FIG. 5, process 500 may include obtaining information concerning a potential network (block 510). For example, the device (e.g., using processor 310, memory 315, storage component 320, input component 325, output component 330, communication interface 335, input component 355, switching component 360, output component 365, controller 370, and/or the like) may obtain information concerning a potential network, as described above.

As further shown in FIG. 5, process 500 may include processing the information concerning the potential network to determine a plurality of configuration parameters associated with the potential network (block 520). For example, the device (e.g., using processor 310, memory 315, storage component 320, input component 325, output component 330, communication interface 335, input component 355, switching component 360, output component 365, controller 370, and/or the like) may process the information concerning the potential network to determine a plurality of configuration parameters associated with the potential network, as described above.

As further shown in FIG. 5, process 500 may include sending a first report that identifies the plurality of configuration parameters to a client device (block 530). For example, the device (e.g., using processor 310, memory 315, storage component 320, input component 325, output component 330, communication interface 335, input component 355, switching component 360, output component 365, controller 370, and/or the like) may send a first report that identifies the plurality of configuration parameters to a client device, as described above.

As further shown in FIG. 5, process 500 may include determining, based on the plurality of configuration parameters, at least one network configuration profile (block 540). For example, the device (e.g., using processor 310, memory 315, storage component 320, input component 325, output component 330, communication interface 335, input component 355, switching component 360, output component 365, controller 370, and/or the like) may determine, based on the plurality of configuration parameters, at least one network configuration profile, as described above.

As further shown in FIG. 5, process 500 may include generating, based on the at least one network configuration profile, a network configuration test plan (block 550). For example, the device (e.g., using processor 310, memory 315, storage component 320, input component 325, output component 330, communication interface 335, input component 355, switching component 360, output component 365, controller 370, and/or the like) may generate, based on the at least one network configuration profile, a network configuration test plan, as described above.

As further shown in FIG. 5, process 500 may include sending a second report that identifies the at least one network configuration profile or the network configuration test plan to the client device (block 560). For example, the device (e.g., using processor 310, memory 315, storage component 320, input component 325, output component 330, communication interface 335, input component 355, switching component 360, output component 365, controller 370, and/or the like) may send a second report that identifies the at least one network configuration profile or the network configuration test plan to the client device, as described above.

As further shown in FIG. 5, process 500 may include causing one or more network devices to be tested according to the network configuration test plan (block 570). For example, the device (e.g., using processor 310, memory 315, storage component 320, input component 325, output component 330, communication interface 335, input component 355, switching component 360, output component 365, controller 370, and/or the like) may cause one or more network devices to be tested according to the network configuration test plan, as described above.

As further shown in FIG. 5, process 500 may include obtaining network configuration test results related to causing the one or more network devices to be tested according to the network configuration test plan (block 580). For example, the device (e.g., using processor 310, memory 315, storage component 320, input component 325, output component 330, communication interface 335, input component 355, switching component 360, output component 365, controller 370, and/or the like) may obtain network configuration test results related to causing the one or more network devices to be tested according to the network configuration test plan, as described above.

As further shown in FIG. 5, process 500 may include sending a third report that identifies the network configuration test results to the client device (block 590). For example, the device (e.g., using processor 310, memory 315, storage component 320, input component 325, output component 330, communication interface 335, input component 355, switching component 360, output component 365, controller 370, and/or the like) may send a third report that identifies the network configuration test results to the client device, as described above.

Process 500 may include additional implementations, such as any single implementation or any combination of implementations described below and/or in connection with one or more other processes described elsewhere herein.

In a first implementation, when obtaining the information concerning the potential network, process 500 includes obtaining a potential network requirements file from a server device and processing the potential network requirements file to determine the information concerning the potential network.

In a second implementation, alone or in combination with the first implementation, at least some configuration parameters of the plurality of configuration parameters relate to traffic routing of packets between a plurality of zones of the potential network.

In a third implementation, alone or in combination with one or more of the first and second implementations, when determining the at least one network configuration profile, process 500 includes identifying a plurality of network configuration profiles; generating, based on the plurality of network configuration profiles, one or more sets of network configuration profiles, wherein a set of network configuration profiles is including one or more network configuration profiles of the plurality of network configuration profiles; determining, for each set of network configuration profiles, of the one or more sets of network configuration profiles, a respective correspondence score that indicates a correspondence between the set of network configuration profiles and the plurality of configuration parameters; identifying a particular set of network configuration profiles with a particular correspondence score and one or more particular network configuration profiles that comprise the particular set of network configuration profiles; and selecting the one or more particular network configuration profiles as the at least one network configuration profile.

In a fourth implementation, alone or in combination with one or more of the first through third implementations, when determining the at least one network configuration profile, process 500 includes identifying a plurality of network configuration profiles; determining, for each network configuration profile, of the plurality of network configuration profiles, a respective correspondence score that indicates a correspondence between the network configuration profile and the plurality of configuration parameters; identifying a particular network configuration profile, of the plurality of network configuration profiles, with a particular correspondence score; determining that the particular correspondence score of the particular network configuration profiles fails to satisfy a threshold; generating, using a machine learning model and based on the plurality of configuration parameters, a new network configuration profile, wherein the new network configuration profile has a correspondence score that satisfies the threshold; and selecting the new network configuration profile as the at least one network configuration profile.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
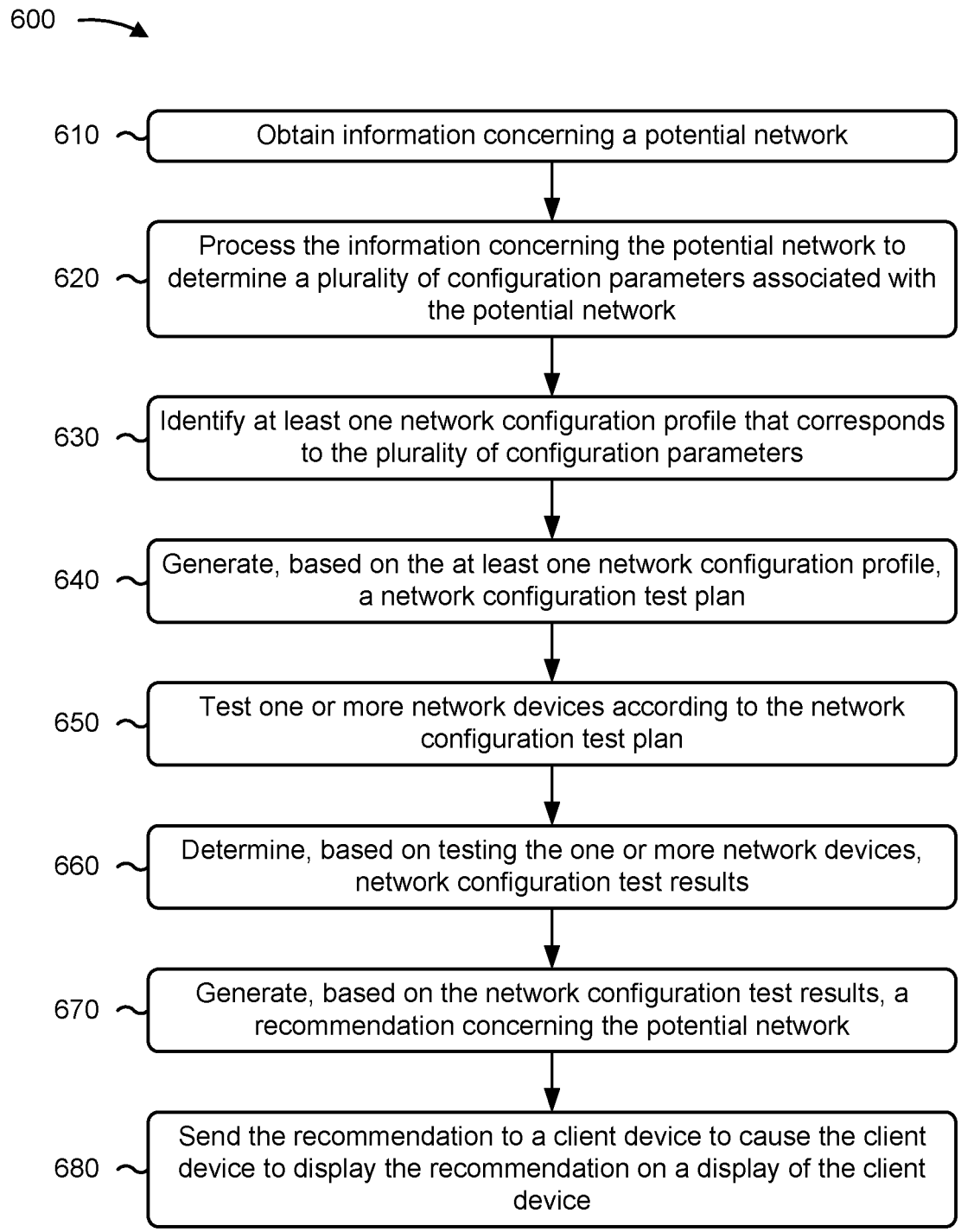

FIG. 6 is a flow chart of an example process 600 for facilitating network configuration testing. In some implementations, one or more process blocks of FIG. 6 may be performed by a device, such as a network analysis device (e.g., network analysis device 210). In some implementations, one or more process blocks of FIG. 6 may be performed by another device or a group of devices separate from or including the device, such as client device 220, and/or the like.

As shown in FIG. 6, process 600 may include obtaining information concerning a potential network (block 610). For example, the device (e.g., using processor 310, memory 315, storage component 320, input component 325, output component 330, communication interface 335, input component 355, switching component 360, output component 365, controller 370, and/or the like) may obtain information concerning a potential network, as described above.

As further shown in FIG. 6, process 600 may include processing the information concerning the potential network to determine a plurality of configuration parameters associated with the potential network (block 620). For example, the device (e.g., using processor 310, memory 315, storage component 320, input component 325, output component 330, communication interface 335, input component 355, switching component 360, output component 365, controller 370, and/or the like) may process the information concerning the potential network to determine a plurality of configuration parameters associated with the potential network, as described above.

As further shown in FIG. 6, process 600 may include identifying at least one network configuration profile that corresponds to the plurality of configuration parameters (block 630). For example, the device (e.g., using processor 310, memory 315, storage component 320, input component 325, output component 330, communication interface 335, input component 355, switching component 360, output component 365, controller 370, and/or the like) may identify at least one network configuration profile that corresponds to the plurality of configuration parameters, as described above.

As further shown in FIG. 6, process 600 may include generating, based on the at least one network configuration profile, a network configuration test plan (block 640). For example, the device (e.g., using processor 310, memory 315, storage component 320, input component 325, output component 330, communication interface 335, input component 355, switching component 360, output component 365, controller 370, and/or the like) may generate, based on the at least one network configuration profile, a network configuration test plan, as described above.

As further shown in FIG. 6, process 600 may include testing one or more network devices according to the network configuration test plan (block 650). For example, the device (e.g., using processor 310, memory 315, storage component 320, input component 325, output component 330, communication interface 335, input component 355, switching component 360, output component 365, controller 370, and/or the like) may test one or more network devices according to the network configuration test plan, as described above.

As further shown in FIG. 6, process 600 may include determining, based on testing the one or more network devices, network configuration test results (block 660). For example, the device (e.g., using processor 310, memory 315, storage component 320, input component 325, output component 330, communication interface 335, input component 355, switching component 360, output component 365, controller 370, and/or the like) may determine, based on testing the one or more network devices, network configuration test results, as described above.

As further shown in FIG. 6, process 600 may include generating, based on the network configuration test results, a recommendation concerning the potential network (block 670). For example, the device (e.g., using processor 310, memory 315, storage component 320, input component 325, output component 330, communication interface 335, input component 355, switching component 360, output component 365, controller 370, and/or the like) may generate, based on the network configuration test results, a recommendation concerning the potential network, as described above.

As further shown in FIG. 6, process 600 may include sending the recommendation to a client device to cause the client device to display the recommendation on a display of the client device (block 680). For example, the device (e.g., using processor 310, memory 315, storage component 320, input component 325, output component 330, communication interface 335, input component 355, switching component 360, output component 365, controller 370, and/or the like) may send the recommendation to a client device to cause the client device to display the recommendation on a display of the client device, as described above.

Process 600 may include additional implementations, such as any single implementation or any combination of implementations described below and/or in connection with one or more other processes described elsewhere herein.

In a first implementation, the recommendation indicates whether the one or more network devices are to be included in the potential network.

In a second implementation, alone or in combination with the first implementation, process 600 includes processing the information concerning the potential network using a configuration analysis technique, a traffic analysis technique, a resource analysis technique, or a verification analysis technique.

In a third implementation, alone or in combination with one or more of the first and second implementations, when identifying at least one network configuration profile that corresponds to the plurality of configuration parameters, process 600 includes identifying a plurality of network configuration profiles; determining, for each network configuration profile, of the plurality of network configuration profiles, a respective correspondence score that indicates a correspondence between the network configuration profile and the plurality of configuration parameters; and selecting, based on the respective correspondence scores of the plurality of network configuration profiles, the at least one network configuration profile from the plurality of network configuration profiles.

In a fourth implementation, alone or in combination with one or more of the first through third implementations, when determining, for each network configuration profile, of the plurality of network configuration profiles, the respective correspondence score that indicates a correspondence between the network configuration profile and the plurality of configuration parameters, process 600 includes identifying one or more respective network configuration profile parameters included in the network configuration profiles and determining a percentage of the plurality of configuration parameters that correspond to at least one network configuration profile parameter of the one or more network configuration profile parameters.

In a fifth implementation, alone or in combination with one or more of the first through fourth implementations, the network configuration test results indicate a respective availability, a respective health, or a respective performance of the one or more network devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, information concerning a first network;
    processing, by the device, the information concerning the first network to determine a plurality of configuration parameters associated with one or more capabilities of the first network;
    identifying, by the device and based on the plurality of configuration parameters, a first network configuration profile, associated with a second network and including a first network configuration profile parameter different from the plurality of configuration parameters, and a second network configuration profile associated with the second network and including a second network configuration profile parameter different from the plurality of configuration parameters and the first network configuration profile parameter;
    determining, by the device and based on comparing the first network configuration profile parameter to the plurality of configuration parameters, a first correspondence score that indicates a correspondence between the first network configuration profile parameter and the plurality of configuration parameters;
    determining, by the device and based on comparing the second network configuration profile parameter to the plurality of configuration parameters, a second correspondence score that indicates a correspondence between the second network configuration profile parameter and the plurality of configuration parameters;
    selecting, by the device and based on determining that the first correspondence score is a greater than the second correspondence score or that the first correspondence score satisfies a threshold, the first network configuration profile,
        wherein determining that the first correspondence score is a greater than the second correspondence score is based on comparing the first correspondence score to the second correspondence score, or determining that the first correspondence score satisfies the threshold is based on comparing the first correspondence score to the threshold;
    generating, by the device and based on selecting the first network configuration profile, a network configuration test plan that includes information identifying one or more network devices to be tested in the second network; and
    causing, by the device, the one or more network devices to be tested in the second network according to the network configuration test plan.

2. The method of claim 1, further comprising:
obtaining network configuration test results related to causing the one or more network devices to be tested in the second network according to the network configuration test plan;
generating, based on the network configuration test results, a network configuration test report; and
causing the network configuration test report to be displayed on a display screen of another device.

3. The method of claim 1, wherein the information concerning the first network comprises at least one of:
information concerning a purpose of the first network;
information identifying one or more segments of the first network;
information indicating one or more features of the first network;
information identifying a topology of the first network;
information indicating a traffic flow of the first network;
information indicating a bandwidth of the first network;
information indicating a latency of the first network;
information indicating a data rate of the first network;
information concerning network deployment parameters of the first network; or
information indicating a user device capacity of the first network.

4. The method of claim 1, wherein processing the information concerning the first network to determine the plurality of configuration parameters associated with the one or more capabilities of the first network comprises:
processing the information concerning the first network to determine a plurality of capabilities, including the one or more capabilities, of the first network; and
processing the plurality of capabilities to determine the plurality of configuration parameters,
wherein each configuration parameter, of the plurality of configuration parameters, is associated with one or more capabilities of the plurality of capabilities of the first network.

5. The method of claim 4, wherein at least one configuration parameter, of the plurality of configuration parameters, is associated with a function of the one or more network devices.

6. The method of claim 1, further comprising:
determining, based on comparing the first correspondence score to the second correspondence score, that the first network configuration profile satisfies the threshold,
wherein selecting the first correspondence score is based on determining that the first network configuration profile satisfies the threshold.

7. The method of claim 1, further comprising:
determining, based on comparing the second correspondence score the threshold that the first correspondence score fails to satisfy the threshold; and
updating, using a machine learning model and based on determining that the first correspondence score fails to satisfy the threshold, the first network configuration profile based on the plurality of configuration parameters,
wherein updating the first network configuration profile increases the first correspondence score, and
wherein selecting the first network configuration profile is based on updating the first network configuration profile.

8. The method of claim 1, wherein the network configuration test plan includes at least one of:
information identifying the one or more network devices;
information identifying a network topology, of the second network, associated with the one or more network devices;
information concerning traffic generation for the second network; or
information concerning an amount of time to test the one or more network devices.

9. The method of claim 1, wherein causing the one or more network devices to be tested according to the network configuration test plan comprises:
sending the network configuration test plan to a network testing device to cause the network testing device to test the one or more network devices according to the network configuration test plan.

10. A device, comprising:
one or more memories; and
one or more processors to:
obtain information concerning a first network;
process the information concerning the first network to determine a plurality of configuration parameters associated with one or more capabilities of the first network;
send a first report that identifies the plurality of configuration parameters to a client device;
identify, based on the plurality of configuration parameters, a first network configuration profile, associated with a second network and including a first network configuration profile parameter different from the plurality of configuration parameters, and a second network configuration profile associated with the second network and including a second network configuration profile parameter different from the plurality of configuration parameters and the first network configuration profile parameter;
determine, based on comparing the first network configuration profile parameter to the plurality of configuration parameters, a first correspondence score that indicates a correspondence between the first network configuration profile parameter and the plurality of configuration parameters;
determine, based on comparing the second network configuration profile parameter to the plurality of configuration parameters, a second correspondence score that indicates a correspondence between the second network configuration profile parameter and the plurality of configuration parameters;
select, based on determining that the first correspondence score is greater than the second correspondence score or that the first correspondence score satisfies a threshold, the first network configuration profile,
wherein determining that the first correspondence score is a greater than the second correspondence score is based on comparing the first correspondence score to the second correspondence score, or determining that the first correspondence score satisfies the threshold is based on comparing the first correspondence score to the threshold;
generate, based on selecting the first network configuration profile, a network configuration test plan that includes information identifying one or more network devices to be tested in the second network;
send a second report that identifies the first network configuration profile or the network configuration test plan to the client device;
cause the one or more network devices to be tested in the second network according to the network configuration test plan;
obtain network configuration test results related to causing the one or more network devices to be tested in the second network according to the network configuration test plan; and send a third report that identifies the network configuration test results to the client device to determine a particular network configuration of the first network.

11. The device of claim 10, wherein the one or more processors, when obtaining the information concerning the first network, are to:
   obtain a network requirements file from a server device; and
   process the network requirements file to determine the information concerning the first network.

12. The device of claim 10, wherein at least one configuration parameter, of the plurality of configuration parameters, relate to a traffic routing of packets between a plurality of zones of the first network.

13. The device of claim 10,
   wherein the one or more processors are further to:
      identify a plurality of network configuration profiles; and
      generate, based on the plurality of network configuration profiles, a set of network configuration profiles including the first network configuration profile and the second network configuration profile,
         wherein identifying the first network configuration profile and the second network configuration profile is based on generating the set of network configuration profiles.

14. The device of claim 10, wherein the one or more processors are further:
   determine, based on determining the first correspondence score and the second correspondence score, that at least one of the first correspondence score or the second correspondence score fail to satisfy a threshold; and
   generate, using a machine learning model and based on determining that the at least one of the first correspondence score or the second correspondence score fail to satisfy the threshold, at least one of a new first network configuration profile, corresponding to the first network configuration profile, or a new second network configuration profile, associated with the second network configuration profile, based on the plurality of configuration parameters,
      wherein the new first network configuration profile has a new correspondence score that satisfies the threshold; and
      wherein the one or more processors, when selecting the first network configuration profile, are to:
         select the new first network configuration profile.

15. A non-transitory computer-readable medium storing instructions, the instructions comprising:
   one or more instructions that, when executed by one or more processors, cause the one or more processors to:
      obtain information concerning a first network;
      process the information concerning the first network to determine a plurality of configuration parameters associated with the first network;
      identify a plurality of network configuration profiles that are associated with a second network and that correspond to the plurality of configuration parameters;
      determine, for each of the plurality of network configuration profiles, a correspondence score that indicates a correspondence between each respective network configuration profile, of the plurality of network configuration profiles, and the plurality of configuration parameters;
      select, based on comparing the correspondence score of each of the plurality of network configuration profiles to a threshold, a particular network configuration profile, of the plurality of network configuration profiles, having a respective correspondence score that satisfies the threshold;
      generate, based on selecting the particular network configuration profile, a network configuration test plan;
      test one or more network devices according to the network configuration test plan;
      determine, based on testing the one or more network devices, network configuration test results of the one or more network devices;
      generate, based on the network configuration test results, a recommendation on whether to include the one or more network devices in the second network; and
      send the recommendation to a client device to cause the client device to display the recommendation on a display of the client device.

16. The non-transitory computer-readable medium of claim 15, wherein the recommendation indicates whether the one or more network devices are to be included in the second network.

17. The non-transitory computer-readable medium of claim 15, wherein the one or more instructions, that cause the one or more processors to process the information concerning the first network to determine the plurality of configuration parameters associated with the first network, cause the one or more processors to:
   process the information concerning the first network using a configuration analysis technique, a traffic analysis technique, a resource analysis technique, or a verification analysis technique.

18. The non-transitory computer-readable medium of claim 15, wherein the one or more instructions, that cause the one or more processors to determine, for each of the plurality of network configuration profiles, the correspondence score that indicates the correspondence between each respective network configuration profile, of the plurality of network configuration profiles, and the plurality of configuration parameters, cause the one or more processors to:
   identify one or more network configuration profile parameters included in the plurality of network configuration profiles; and
   determine, for each respective network configuration profile of the plurality of network configuration profiles, a percentage of the plurality of configuration parameters that correspond to at least one network configuration profile parameter of the one or more network configuration profile parameters.

19. The non-transitory computer-readable medium of claim 15, wherein the network configuration test results indicate a respective availability, a respective health, or a respective performance of the one or more network devices.

20. The non-transitory computer-readable medium of claim 15, wherein the one or more instructions, when executed by the one or more processors, further cause the one or more processors to:
   determine that the correspondence score of the particular network configuration profile fails to satisfy a threshold; and
   update, using a machine learning model and based on the plurality of configuration parameters, the particular network configuration profile to create an updated particular network configuration profile,
      wherein updating the particular network configuration profile increases the correspondence score; and
   wherein the one or more instructions, that cause the one or more processors to select the particular network configuration profile, cause the one or more processors to:

select the updated particular network configuration profile as the particular network configuration profile.

\* \* \* \* \*

UNITED STATES PATENT AND TRADEMARK OFFICE
CERTIFICATE OF CORRECTION

PATENT NO. : 11,165,648 B1
APPLICATION NO. : 16/583844
DATED : November 2, 2021
INVENTOR(S) : Anil Kumar Bollineni et al.

Page 1 of 1

It is certified that error appears in the above-identified patent and that said Letters Patent is hereby corrected as shown below:

In the Claims

Claim 14
Column 25, Line 28, change "processors are further:" to --processors are further to:--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*